US008352278B2

(12) United States Patent
Ostrowski et al.

(10) Patent No.: US 8,352,278 B2
(45) Date of Patent: Jan. 8, 2013

(54) METHODS AND SYSTEMS FOR RESOLVING THE INCOMPATIBILITY OF MEDIA ITEMS PLAYABLE FROM A VEHICLE

(75) Inventors: Jeffrey Raymond Ostrowski, Dearborn, MI (US); Julius Marchwicki, Detroit, MI (US); Darren Peter Shelcusky, Saline, MI (US); Matthew Scott Bourdua, Peachtree City, GA (US)

(73) Assignee: Ford Global Technologies, LLC, Dearborn, MI (US)

( * ) Notice: Subject to any disclaimer, the term of this patent is extended or adjusted under 35 U.S.C. 154(b) by 857 days.

(21) Appl. No.: 12/476,293

(22) Filed: Jun. 2, 2009

(65) Prior Publication Data
US 2010/0305951 A1 Dec. 2, 2010

(51) Int. Cl.
*G10L 15/00* (2006.01)
*G06F 17/00* (2006.01)
(52) U.S. Cl. .................................. 704/275; 455/569.2
(58) Field of Classification Search .................. 704/275; 455/569.2
See application file for complete search history.

(56) References Cited

U.S. PATENT DOCUMENTS

| | | | |
|---|---|---|---|
| 6,314,094 B1 | 11/2001 | Boys | |
| 6,587,127 B1 | 7/2003 | Leeke et al. | |
| 7,159,000 B2 | 1/2007 | Plastina et al. | |
| 7,362,999 B2 | 4/2008 | Petschke et al. | |
| 8,042,140 B2 * | 10/2011 | Thomas et al. | 725/94 |
| 2002/0072326 A1 | 6/2002 | Qureshey | |
| 2004/0246940 A1 | 12/2004 | Kubler et al. | |
| 2004/0249663 A1 | 12/2004 | Shishido | |
| 2005/0055372 A1 | 3/2005 | Springer, Jr. et al. | |
| 2007/0299978 A1 | 12/2007 | Neumann et al. | |
| 2008/0114664 A1 | 5/2008 | Harb | |
| 2009/0075624 A1 | 3/2009 | Cox et al. | |
| 2009/0117890 A1 | 5/2009 | Jacobsen et al. | |
| 2009/0319341 A1 | 12/2009 | Berkobin et al. | |
| 2010/0241507 A1 | 9/2010 | Quinn et al. | |

(Continued)

FOREIGN PATENT DOCUMENTS
EP 1137210 A2 9/2001
(Continued)

OTHER PUBLICATIONS
Ford Motor Company, "SYNC with Navigation System," Owner's Guide Supplement, SYNC System Version 1 (Jul. 2007).

(Continued)

*Primary Examiner* — Susan McFadden
(74) *Attorney, Agent, or Firm* — Jennifer M. Stec; Brooks Kushman P.C.

(57) ABSTRACT

A system for monitoring hands-free accessibility of media items for play at a vehicle includes a vehicle entertainment computing system (VECS) configured to receive predetermined rules for voice-activated access of the media items. Violations of the rules are detected based on media item metadata. If a violation is detected, a prompt is outputted. Media items are retrieved and played based on voice-activated requests. One embodiment includes a method for monitoring hands-free accessibility of media items for play at a vehicle. A system for formatting media items for accessibility at a VECS includes a media item incompatibility resolution system (MIIRS) configured to resolve violations of the predetermined rules by receiving additional rules relating to formatting violating media items. The media items are searched and the violations addressed by reformatting the media items for voice-activated access. The media items are outputted to the MIIRS.

18 Claims, 6 Drawing Sheets

U.S. PATENT DOCUMENTS

2011/0296037 A1\* 12/2011 Westra et al. ................. 709/228

FOREIGN PATENT DOCUMENTS

| GB | 2366055 A | 2/2002 |
| --- | --- | --- |
| WO | 2007123797 A1 | 11/2007 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

International Search Report filed in GB 1007815.2 dated Sep. 6, 2010.

www.wired.com/entertainment/music/commentaiy/listeningpost/2005/11/69653, printed Sep. 4, 2008.

www.magic-tagger.com/eng/home.php, printed Oct. 31, 2008.

www.magnusbrading.com/mp3ts/main.html, printed Sep. 4, 2008.

www.softpointer.com/index.htm, printed Sep. 4, 2008.

Kermit Whitfield, "A hitchhiker's guide to the telematics ecosystem", Automotive Design & Production, Oct. 2003, http://findarticles.com, pp. 1-3.

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

\* cited by examiner

FAQs

Sync My iTunes ← View More FAQ Topics

Select a Question Below to View the Answer

- Are There Any Specific File Formats Required for Sync My iTunes?
- Does Sync My iTunes Work With All Media Players
- How Often do I Need to Correct My Music with Sync My iTunes?
- Some of the Songs on My iPod Won't Play Through Sync. How do I Ensure the Music on My iPod Will Play Through Sync?
- Sometimes, When I Correct My iPod, it Doesn't Communicate with Sync. How do I Fix it?
- What do I Need to Download Sync My iTunes?
- What is Sync My iTunes?
- What Media Players and Music Formats Does Sync Support?
- What Playlist Formats can be Played by Sync?
- What Version of iTunes do I Need for Sync My iTunes?
- Where Can I Download the Sync My iTunes Software?
- Why do I Need Sync My iTunes?
- Why does Some of the Music on My iPod Not Play on Sync?
- Why does Sync Not Play the Protected Media on My iPod?

Are There Any Specific File Formats Required fo Sync My iTunes?

Sync My iTunes Works with All Media File Formats That are Supported by Sync MPS, AAC, VMA, WAV, and MPEG Audio Details Related Topics

| File Formats | Indexing |
| iPod | Media Player |
| Microsoft | Playlists |
| Sync My iTunes | SyncMyRide.com |
| Tested Media Players | |

Fig-5

METHODS AND SYSTEMS FOR RESOLVING THE INCOMPATIBILITY OF MEDIA ITEMS PLAYABLE FROM A VEHICLE

BACKGROUND

1. Technical Field

The present invention relates to methods and systems for resolving the incompatibility of media items playable from a vehicle.

2. Background Art

The TAG&RENAME software manufactured by Softpointer, Inc (available at www.softpointer.com) is a music files tag editor that handles all popular digital audio formats. With TAG&RENAME, a user can manually edit music files tags, automatically fix and complete file tags using the online FREEDB database, load titles and cover art from the AMAZON.COM server, load titles from the TRACKTYPE.ORG server, get tags data from file names and its folders structures, rename your music files and folders according to its music information in a batch, and create play lists. Tag&Rename is a handy management utility designed for many types of music files. With Tag&Rename you can quickly and easily rename your music collection using the embedded tag data within music files, write new or edit existing tag information, create tags based on file names, get song information from the FREEDB server, or import it from the AMAZON.COM server.

U.S. Pat. No. 7,159,000 issued to Plastina et al. (directed to methods and systems for repairing playlists) provides various systems and methods which permit a user's content experience (e.g. music playing experience) to be monitored and for metadata describing this experience to be collected. This metadata can be dynamically updated as a user experiences media content and then used to impart to the user a personalized experience that is tailored to that specific user. A user's metadata can, in some instances, be provided across a wide variety of computing devices on which the user may experience the media content, thus standardizing the user's personalized media experience. In addition, intelligent or "smart" playlists can be provided which, in some instances, can be dynamically and automatically updated to reflect current user experiences, thus providing a highly personalized and enjoyable content experience.

U.S. Publication Number 2007/0299978 issued to Neumann et al. (directed to management of podcasts) provides improved techniques that facilitate the use of podcasts. The improved techniques can pertain to publishing, hosting, accessing, subscribing, managing, organizing, searching, browsing, transferring, and/or playing podcasts. According to one aspect, tags are embedded into syndication feeds (e.g., RSS feeds) that may be made available for distribution by an online media store to facilitate the management of podcasts. Such tags can include a block tag that may be embedded into a syndication feed to indicate whether the feed is to be blocked from being included in the online media store. According to another aspect, management of podcasts may be facilitated by other mechanisms. In accordance with one embodiment, a user may challenge the ownership of a podcast to block or remove a podcast from the online media store. In accordance with another embodiment, images may be stored to allow efficient retrieval of the corresponding episode(s) of a podcast.

SUMMARY

One aspect may include a computer implemented system for monitoring in a vehicle the hands-free accessibility of a plurality of media items from a media item repository for play at the vehicle. The system may include a vehicle entertainment computing system (VECS). The VECS may be configured to receive a number of predetermined rules relating to voice-activated access of one or more media items playable at the VECS. In one embodiment, the predetermined rules may include rules relating to the format of the media items. In another embodiment, the predetermined rules may include rules relating to the content of the media items.

The one or more media items may be associated with one or more identifying characteristics including, but not limited to, a genre, album, artist, or song. In one embodiment, the one or more media items may be accessed by receiving a spoken request for one or more media items using the one or more identifying characteristics. The requests for access to the one or more media items may be received by a voice-recognition engine.

The VECS may be further configured to detect violations of one or more of the predetermined rules with respect to the accessibility of the one or more media items. Detection of the violations may be based on metadata associated with the one or more media items.

If one or more violations are detected, a prompt may be outputted at the VECS. The prompt may be outputted in a spoken language. The prompt may further include instructions for addressing the one or more violations.

The VECS may be further configured to retrieve and play requested media items based on a voice-activated request for the media items.

In one embodiment, the VECS may be configured to receive a link connecting a media item repository to the VECS for facilitating the transmission of a number of media items between the media item repository and the VECS.

The system may further include a media item incompatibility resolution system (MIIR). The MIIR may be configured to resolve the one or more violations of the predetermined rules in the media items. The resolution of the violations may occur by receiving a number of additional predetermined rules relating to formatting the one or more violating media items for voice-activated access of the media items.

The one or more violations may be addressed by reformatting the one or more violating media items based on the additional predetermined rules to enable voice-activated access of the one or more reformatted media items. In one embodiment, the one or more media items may be associated with one or more identifying characteristics having a maximum number of media item associations. The one or more violations may be addressed by incrementing the identifying characteristic upon reaching the maximum number.

The one or more reformatted media items may be then outputted to the media incompatibility resolution system.

In one embodiment, the VECS may be further configured to receive access to all non-violating media items. The VECS may play at least one of the plurality of non-violative media items.

Another aspect may include a computer-implemented method for monitoring in a vehicle the hands-free accessibility of a number of media items from a media item repository for play at the vehicle. The method may include receiving a number of predetermined rules relating to voice-activated access of one or more media items playable at a VECS. The requests for access to the one or more media items may be received by a voice-recognition engine. In one embodiment, the one or more media items may be associated with one or more identifying characteristics including, but not limited to, a genre, album, artist, or song. The one or more media items may be accessed by receiving a spoken request for the one or more media items using the one or more identifying characteristics.

The method may further include detecting violations of one or more of the predetermined rules with respect to the accessibility of the one or more media items. The violations may be detected based on metadata associated with the one or more media items.

If one or more violations are detected, a prompt may be outputted at the VECS. The prompt may further include instructions for addressing the one or more violations.

The method may further include retrieving and playing one or more requested media items based on a voice-activated request for the one or more media items.

The method may further include receiving a connection between a media item repository and the vehicle entertainment computing system and facilitating the transmission of a plurality of media items between the media item repository and the vehicle entertainment computing system.

The method may further include resolving the one or more violations of the first plurality of predetermined rules. The one or more violations may be resolved by receiving a number of additional predetermined rules relating to formatting the one or more violating media items in order to enable voice-activated access of the of the one or more media items.

The method may further include addressing the one or more violations by reformatting the one or more violating media items based on the additional rules. In one embodiment, the one or more media items may be associated with one or more identifying characteristics having a maximum number of media item associations. The addressing step may further include incrementing the identifying characteristic upon reaching the maximum number.

The method may further include outputting the one or more reformatted media items to a media incompatibility resolution system.

The method may further include receiving access to all media items not violating the first plurality of predetermined rules and, upon receiving access, playing at least one of the plurality of non-violative media items.

Another aspect may include a computer implemented system for formatting a plurality of media items for accessibility at a VECS from a media item repository. The computer implemented system may include a media item incompatibility resolution system which may be configured to resolve one or more violations of a number of predetermined rules relating to accessing media items at a VECS. The predetermined rules may be stored in a VECS.

The one or more violations may be resolved by receiving additional predetermined rules relating to formatting the one or more violating media items. Based on the additional predetermined rules, searching a plurality of media items stored in a media item repository for one or more violating media items requiring formatting.

The one or more violations may be addressed by reformatting the one or more violating media items to enable voice-activated access of the one or more reformatted media items The one or more reformatted media items may then be outputted to the media incompatibility resolution system.

These and other aspects of the present invention will be better understood in view of the attached drawings and following detailed description of the invention.

BRIEF DESCRIPTION OF THE DRAWINGS

FIG. 5 shows an exemplary display of an exemplary aspect of one embodiment of the various embodiments of the present invention.

DETAILED DESCRIPTION OF THE VARIOUS EMBODIMENTS

Detailed embodiments of the present invention are disclosed herein. However, it is to be understood that the disclosed embodiments are merely exemplary of the invention that may be embodied in various and alternative forms. Therefore, specific functional details herein are not to be interpreted as limiting, but merely as a representative basis for the claims and/or as a representative basis for teaching one of ordinary skill in the art to variously employ the present invention.

Figure 1:
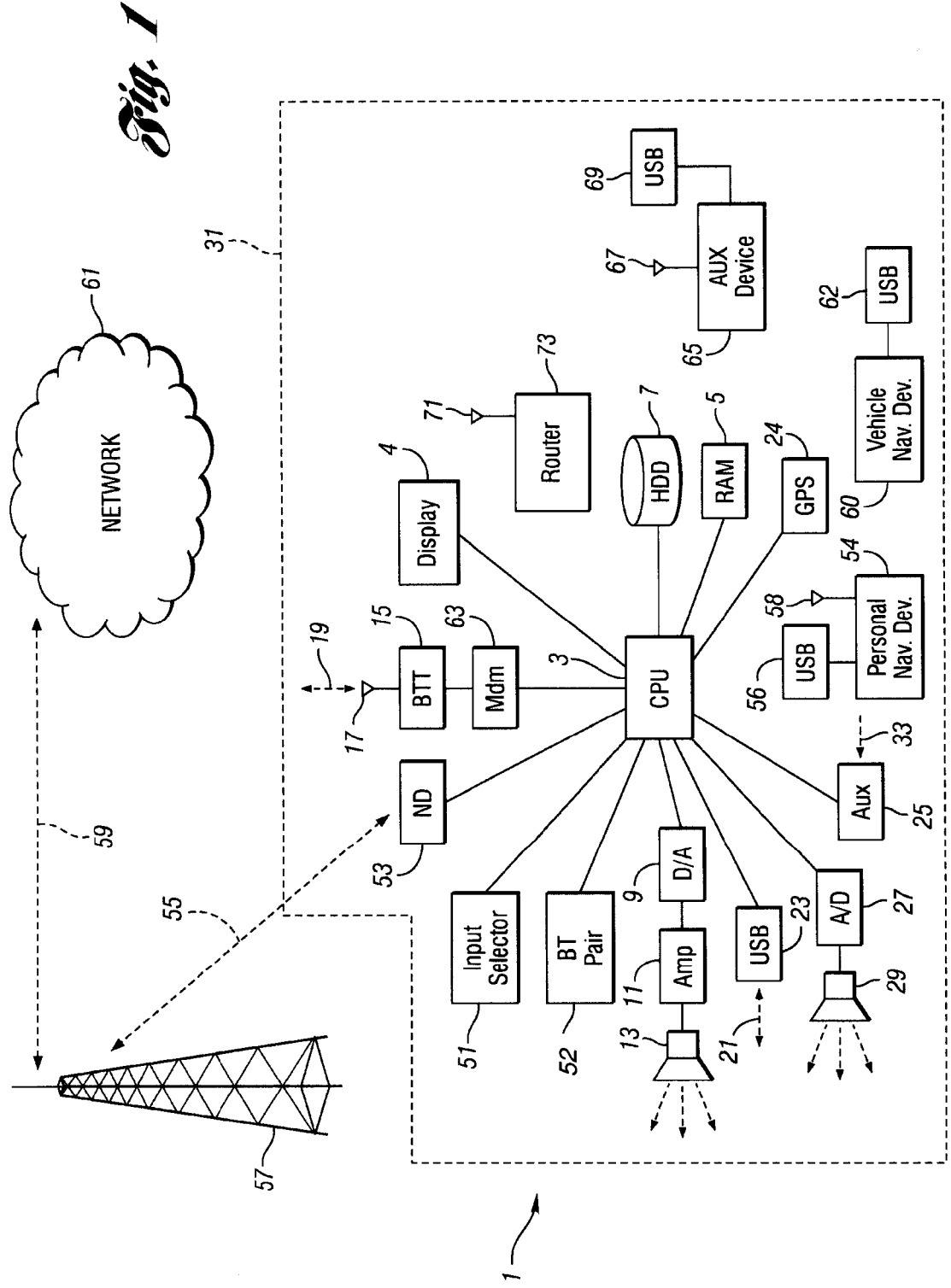
FIG. 1 shows an example system for normalization of media items playable from a vehicle according to one of the various embodiments.

FIG. 1 illustrates system architecture of an illustrative onboard communication system usable for playing media items from a vehicle. A vehicle computing entertainment system may contain a visual front end interface 4 located in the vehicle. The user may also be able to interact with the interface if it is provided, for example, with a touch sensitive screen. In another illustrative embodiment, the interaction occurs through audible speech and speech synthesis.

In the illustrative embodiment 1 shown in FIG. 1 a processor 3 controls the operation of the system. Provided within the vehicle itself, the processor allows onboard processing of commands and routines. Further, the processor is connected to both temporary 5 and permanent storage 7. In this illustrative embodiment, the temporary storage is random access memory (RAM) and the permanent storage is a hard disk drive (HDD) or flash memory.

The processor is also provided with a number of different inputs for the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device (not shown) or a USB device (not shown) along the bi-directional data streams shown at 19 and 21 respectively.

In one illustrative embodiment, the system 1, uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 53 or similar input, telling the CPU that the onboard BLUETOOTH transceiver will be paired with a BLUETOOTH transceiver in a nomadic device.

Data may be communicated between CPU 3 and network 61 utilizing a data-plan associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. This data may include such things as media items stored in the nomadic device. In one embodiment, the data can be stored on the HDD 7 until such time as the data is no longer needed.

A number of peripherals may be in communication with or attached to system 1, such as a personal navigation device 54, having, for example, a USB connection 56, and/or an antenna 58, a vehicle navigation device 60, having a USB 62 or other connection, an onboard GPS device 24, or remote navigation system (not shown) having connectivity to network 61. In one embodiment, peripherals 54, 60, 24 and the remote navigation system may be used to obtain route information from one or more of these sources.

Various other peripherals may be in communication with system 1, for example, Aux device 65 having a USB connection 69 and/or antenna 67 which, in one embodiment, may be a media player (PMP) such as PMPs manufactured by The Apple Corporation and Microsoft (hereinafter referred to as PMP 65). PMP 65 may have a plurality of media items stored in memory (not shown) and playable at system 1, terminal 82 (FIG. 2), or other computing systems. Media items stored in PMP 65 may include, but are not limited to, audio and video files. In one embodiment, media items may be playable from the vehicle with or without the PMP 65.

System 1 may be configured to receive a number of media items and detect if any of the media items violate a predetermined set of rules relating to playing the media items at system 1. The predetermined rules may relate to playing the media items through the use of a voice engine (not shown) in communication with system 1 (e.g., stored in CPU 3). The predetermined rules may be programmed to and stored in CPU 3. This process may be referred to as "normalization," and will be further described below. If an error is detected by system 1, the user/occupant may be directed to an off board site (e.g., a website) to address the detected violations to generate playable media items.

System 1 may retrieve one or more requested media items based on a voice-activated request. The one or more requested media items may then be played from system 1.

Figure 2:
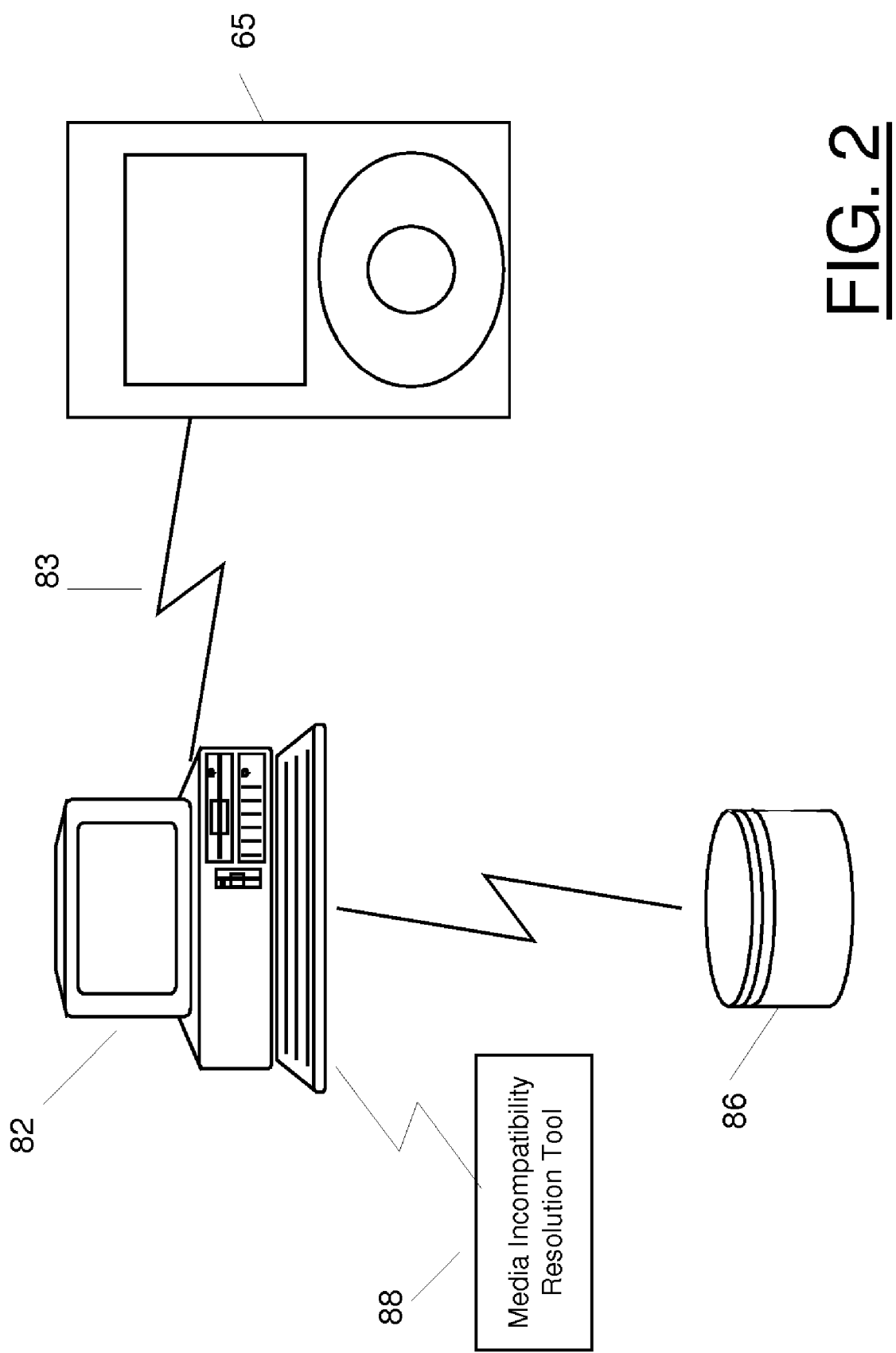
FIG. 2 shows an example system for normalization of media items playable from a vehicle according to another one of the various embodiments.

FIG. 2 shows an example system for addressing the incompatibility of the media items for playablity at a vehicle according to another embodiment of the present invention. The user may connect the media device (e.g., PMP 65) to a terminal 82. Connection 83 may include wired (e.g., USB, FireWire, and the like) or wireless (e.g., BLUETOOTH, WiFi and the like). The terminal 82 may be located at a person's home, place of business, or at any location where a user may have access to a terminal 82. Terminal 82 may be a desktop, laptop, or any other personal computing device. In one embodiment, terminal 82 may be in communication with a database 86 having a plurality of media items. One example of such a database is the ITUNES database manufactured by APPLE CORPORATION.

System 80 may further include media item incompatibility resolution tools (also called error correction tool) for addressing media item violations. Tool 88 may be in communication with terminal 82 and programmed to a computer readable medium stored in terminal 82 or accessible over a network (not shown) on a remote terminal (not shown). Tool 88 may include computer readable instructions for performing the operation of the various embodiments of the present invention (as will be described in further detail below). In one embodiment, tool 88 may be downloadable from a remote server (not shown). In another embodiment, tool 88 may additionally or alternatively be stored in CPU 3 and in communication with system 1 (of FIG. 1).

Figure 3:
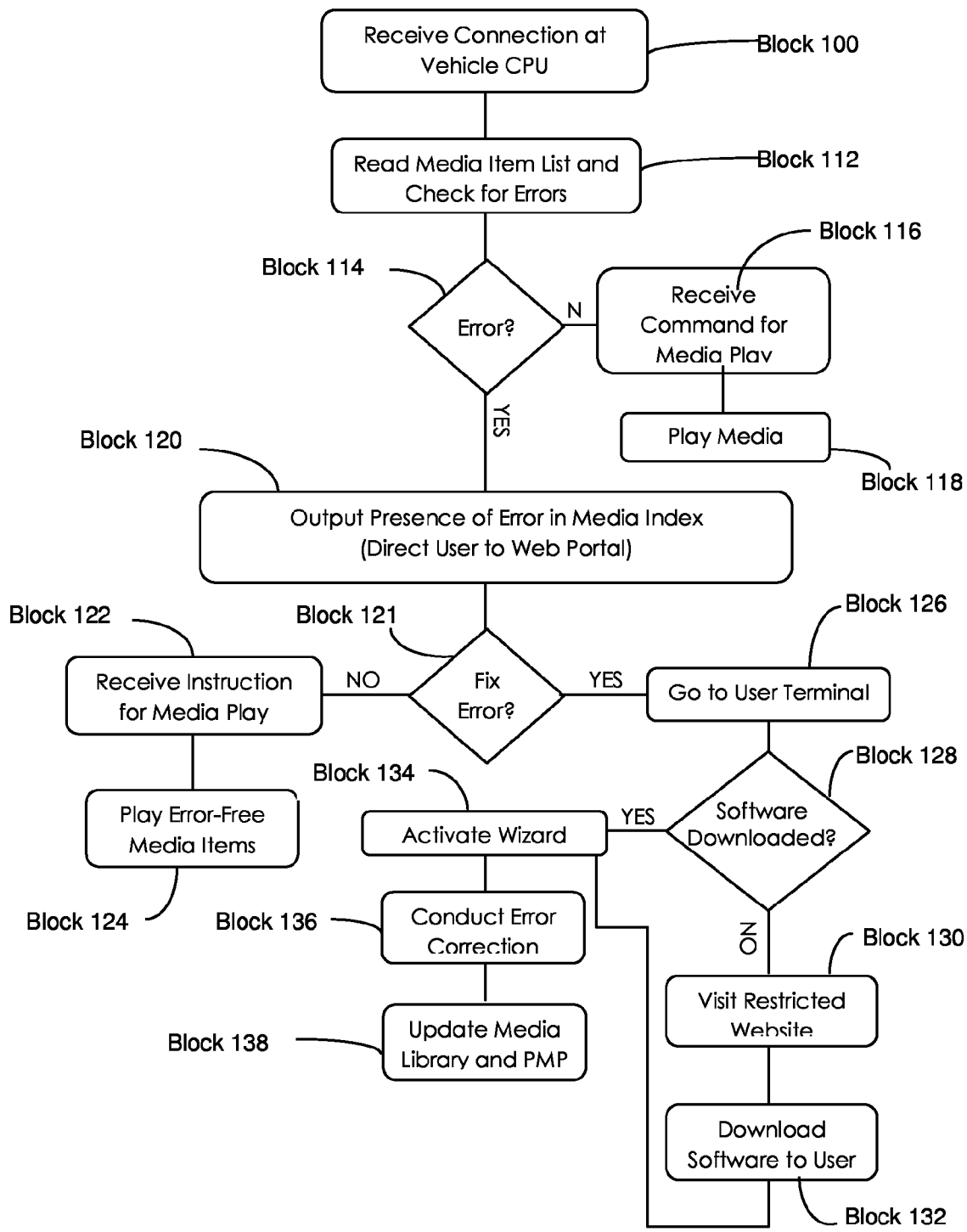
FIG. 3 shows one example of the operation of the normalization of media items playable from a vehicle according to one of the various embodiments.

FIG. 3 shows one example of the operation for resolving the incompatibility of media items playable from a vehicle according to an embodiment of the present invention. PMP 65 may be connected to the CPU 3 (e.g., through USB or BLUETOOTH) of the system 1. CPU 3 will receive the connection as in block 100 and read the media items from the PMP 65 as in block 112 to check for any violations in the media items as in block 112 against a plurality of predetermined rules programmed to or stored in CPU 3. In one embodiment, the rules may relate to playing the media items through a voice engine (not shown) in communication with system 1. If the media items do not violate any rules as in block 114, CPU 3 may listen for and receive a command from a user for media play as in block 116. In one embodiment, the command may be made via an occupant's voice and received by a voice engine (not shown) in communication with system 1. In another embodiment, the command may be initiated by the press of a button at the vehicle (e.g., from the steering wheel, instrument cluster, center console, etc.). The CPU 3 will then play the requested media file as in block 118. An example command may be "play Rock."

If violations are detected with any media item in the media library as in block 114, a prompt or message indicating an error may output to the user upon making the connection as in block 120. In one embodiment, the error prompt may indicate, in spoken language, that an error exists in the media library and may also state that media items having an error cannot be played. The error prompt or message may alternatively be any audible sound. The prompt may further direct the user to a website to download tool 88 (e.g., a "wizard") for addressing the media item incompatibility as in block 120. The website may be restricted to registered members (e.g., owners of vehicles with a system 1), requiring user registration or authentication for access. Alternatively, CPU 3 may be configured to execute, or download and execute, the error correcting software within the vehicle.

The one or more detected rule violations (i.e., errors) of the media items may typically be with regard to the indexing of the media items. An index may be rules relating to a media library's organization of media items. Media items may be of a variety of media file formats including, but not limited to, MP3, MP4, WAV, AAC, and the like. Non-limiting examples of indexing errors may include misspellings, incorrect capitalization, words in all capitalization, incorrect spacing, and the like. Specific examples of errors and error correction will be further described below.

The system 1 may not play any music containing an error. Upon detecting errors, the user may choose not to fix the error as in block 121. If so, system 1 may receive the instruction to play one or more media items as in block 122 and upon receiving the instructions, those items not containing an error may be played as in block 124 from vehicle 31.

If the user decides to fix the error (e.g., at user terminal 82) as in block 121, the user may visit a website (as may be directed by the system 1 according to one embodiment) from a terminal 82 as in block 126. If the user has not downloaded the wizard as in block 128, the user may log onto the website as in block 130 and download the wizard to the terminal 82 as in block 132. The website may be restricted to users with vehicles having a system 1.

In one embodiment, as represented in FIG. 5 upon visiting the website, the user may access a Frequently Asked Questions (FAQ) page 150 containing a link 152 to the wizard. One example of a question that may be asked and is associated with the software may be "Where can I download the Sync My iTunes Software?" The answer may provide a direct link to the media data item correction software (i.e., wizard) for downloading to the user's terminal. The answer may alternatively be directed to an external website from which to download the software.

In another illustrative embodiment, any media device (e.g., PMP 65 or Flashdrive) may be connected to user terminal 82 and one or more media data item errors on the media storage device may be detected. If the error correction wizard has been downloaded to user terminal 82 (as will be described below), an error detection prompt may be transmitted from user terminal. In one embodiment, no error message is transmitted and errors are detected upon or soon after activating the wizard.

Referring back to FIG. 3, after the wizard has been downloaded as in block 128, the user may activate the error correction wizard as in block 134. The wizard may guide a user through the steps necessary for correcting the errors in the media items as in block 136. The wizard may be a GUI based program. In one embodiment, the wizard is designed to look and behave like a standard MICROSOFT WINDOWS wizard.

In one embodiment, the wizard may resolve violations to media files stored in a user's electronic media library (e.g., ITUNES manufactured by THE APPLE CORPORATION). The media library may be stored in the terminal's 82 memory or on a server (not shown) accessed through a network. The electronic media library may be used to upload, update and store media files to the user terminal 82, PMP 65, a cell phone (not shown) or any other media device. Additionally or alternatively, media items can be played directly from the electronic media library.

The user may activate the wizard as in block 134 from the terminal 82 by clicking on a GUI icon, selecting the program from a menu, or other means known in the art. Upon completing the search and correction steps as in block 136, the user may or may not be asked to confirm any corrections made through the wizard as represented in at least two alternative embodiments of the algorithm represented by FIGS. 6 and 7. Upon resolving the media item violations, the PMP 65 and/or media library may be updated as in block 138.

In an alternative embodiment not illustrated in FIG. 3, the error may be corrected at the vehicle utilizing CPU 3 (FIG. 1). Preferably, the tool 88 is already installed in system 1 (e.g., within hard disk 7). Alternatively, the tool 88 may be uploaded to hard disk 7 from a flash drive at USB interface 23, or downloaded wirelessly. Wireless download may be accomplished utilizing a person's cellular telephone connected to CPU 3 by BLUETOOTH transceiver 15. A data over voice (or "in-band") data connection may be established with a remote service provider (not shown) for downloading the tool 88. Alternatively, a telephone having a data plan may be utilized to provide CPU 3 with a broadband connection to the internet for downloading the tool 88. Preferably, authentication is implemented to determine which vehicles have downloaded the tool 88. This may be accomplished by transmitting information including the vehicle identification number (VIN) together with the downloaded request.

Figure 6:
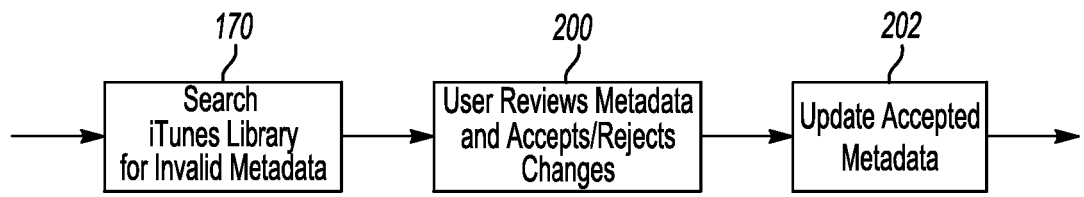
FIG. 6 shows another example of the operation of the normalization of media items playable from a vehicle according to another one of the various embodiments.
Figure 7:
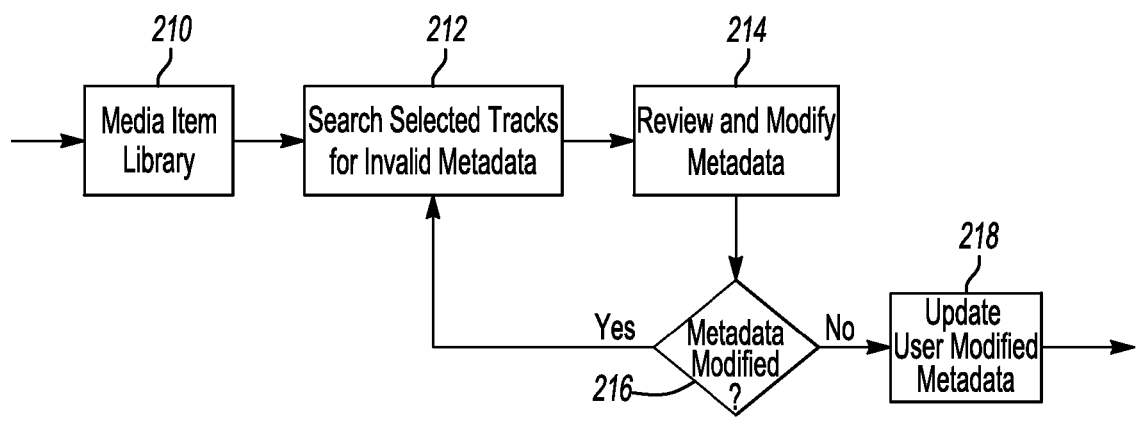
FIG. 7 shows another example of the operation of the normalization of media items playable from a vehicle according to another one of the various embodiments.

FIGS. 6 and 7 show two alternative algorithms for normalization of media items in accordance with embodiments of the present invention. In one embodiment shown in FIG. 6, the wizard may search the media items for errors as in block 170. A confirmation may be displayed for a user to accept or reject the changes as in block 200. If the changes are accepted, the wizard will update the media items with the changes as in block 202. In an alternative embodiment, as shown in FIG. 7, the algorithm may provide for automatic updates without user confirmation. The media items may be searched as in block 212 for errors. In block 214, the media items with errors may be modified. If further modifications remain, algorithm will loop as in block 216 and search again for errors. If no further modifications remain as in block 216, the media items may be updated as in block 218. In all cases where modifications to media items have been made, the wizard may update the media items as in block 138 (FIG. 3). Alternatively or additionally, simultaneously or soon after, the wizard may update the media items in a connected media device (e.g., PMP 65 or Flashdrive) as in block 138 (FIG. 3).

Correcting media item errors in the media library may be referred to as "normalization." Normalization of a user's media library assists in generating a better user experience when playing media items from the system 1 or from the user terminal 82. For example, a user's media item library may list Rock music as "RoCk", "ROCK" or "rOcK" under the genre field. If a user does not correct these errors in the media library, a media item under this genre may not play because Rock, as one example, as dictated by the predetermined rules programmed to CPU 3, may require a certain syntax or format for a media item (e.g., written as "Rock"). The predetermined rules may also related to the content of the media items.

Accordingly, when indexed with all capital letters for example, CPUs may recognize the media item as an acronym "R.O.C.K." rather than as a word for Rock. As such, the wizard may find and correct such violations to the predetermined rules and others. The result, therefore, may be that when a spoken request for "Rock" is made by the user, all media items associated with this genre will be recognized as "Rock" and played. Therefore, normalization provides for an even flow of media items played from a media device and the user is given a better playing and listening experience. Further details and limitations including categorization and organization of the media library (e.g., media file type, artist name, genre) will be further described below.

In one embodiment, a check may additionally or alternatively be made against a media item content data based (for example, the Free DB database) to further detect violations of content of the media items. For example, a check may be made to determine whether a plurality of media items are associated with the correct genres, artists, album, etc. As another example, a check may also be made to verify the spelling of each media item.

Figure 4:
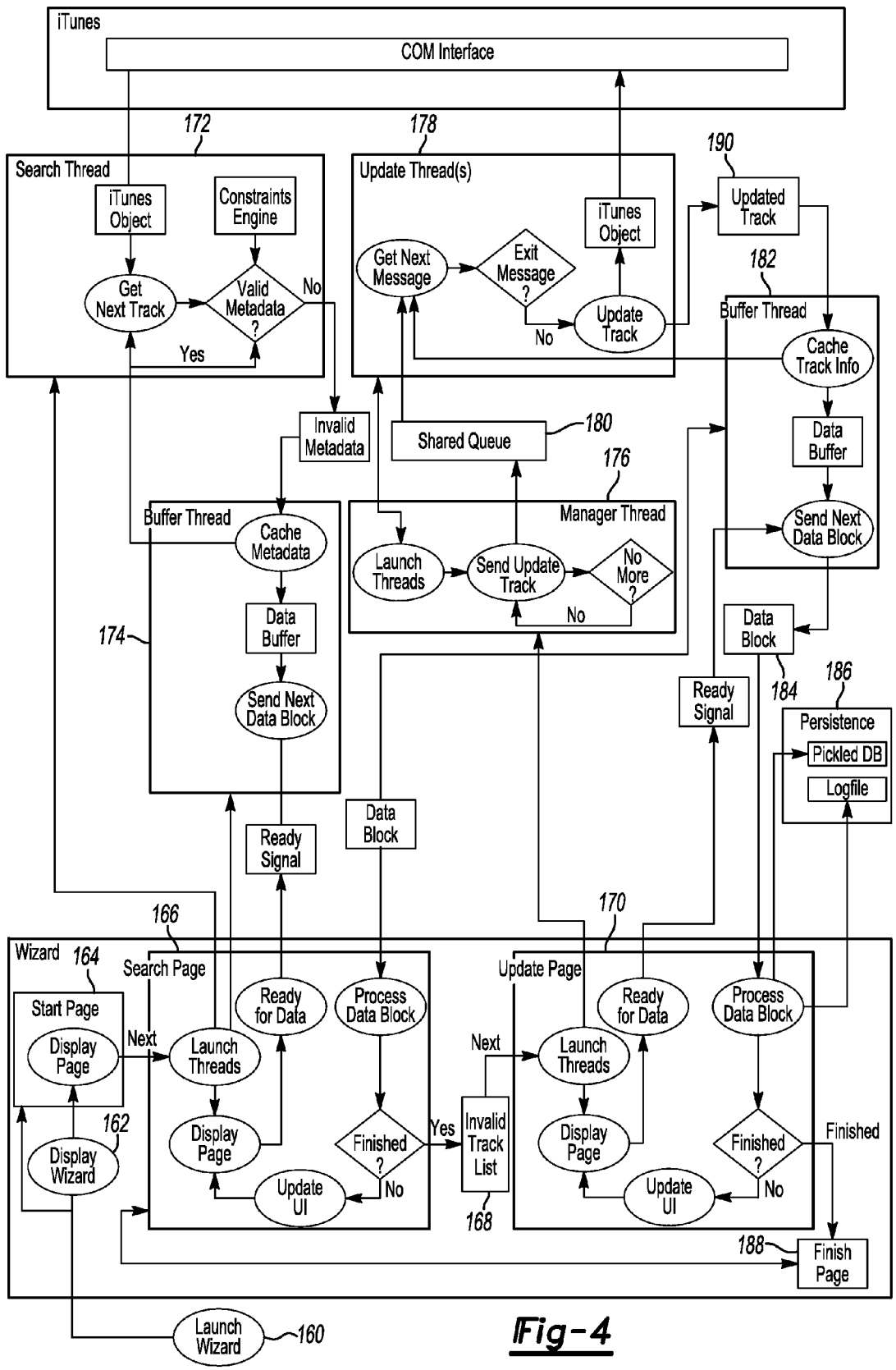
FIG. 4 shows a detailed algorithm of the wizard for searching, retrieving, and updating media files according to one of the various embodiments.

FIG. 4 is a more detailed algorithm of the wizard for searching, retrieving, and updating media files according to one embodiment. A launch wizard function will be initiated as in block 160. The wizard is displayed at the user terminal (or alternatively, within the vehicle) as in block 162. The wizard may commence at a start page and will be displayed at the user terminal as represented in block 164. The wizard may proceed to a search page as in block 166 which may initiate a series of actions including, but not limited to, triggering one or more background actions or processes (i.e., threads), displaying the search page, and preparing to receive the data as represented in block 166.

In one embodiment, a command button on the search page (not shown) may be illuminated to indicate readiness to begin the search process. From the search page, a search thread may be triggered as represented in block 172. The search thread may perform a number of tasks including, but not limited to, receiving data from a media database through a software communications interface (e.g., an ITUNES COM interface developed by MICROSOFT), receiving a media item, and comparing the item's metadata to one or more normalization rules to determine validity as represented in block 172. Normalization rules may be programmed to a computer readable medium and/or stored in terminal 82 or CPU 3. In one embodiment, the normalization rules may be programmed to tool 88 and downloadable to terminal 82 and/or CPU 3 and stored in memory. Updates to the rules may be made by a user and/or downloaded. In one embodiment, the user may define his or her own rules and program them to tool 88.

The search thread may continue the process until it receives invalid metadata. Metadata to and from the search thread may be temporarily stored in a buffer thread as represented in block 174.

Invalid metadata may be captured and processed by the search page as represented in block 166. If the search process has not yet been completed (e.g., unrecoverable errors remain), the search process as described above may re-commence as represented in block 166. In one embodiment, an unrecoverable error may be an invalid metadata field which is not available for write access. This check may be made upon or soon after discovering any invalid metadata. If the search process has completed as represented in block 166, an invalid data track list may be generated as represented in block 168 and the data may be sent to the update process as in block 170.

The wizard may then proceed to an update page as represented in block 170 which may or may not require user intervention. By launching the update page, steps similar to those when launching the search page may be generated. Specifically, displaying the update page will trigger the launch of various threads as represented in block 170. There may be a manager thread as represented in block 176 and an update thread as in block 178. The manager thread as represented in block 176 may decide which changes to make to the invalid media track list. The update thread as represented in block 178 may make the changes to the invalid track list. In an alternative embodiment to the algorithm, there may be no manager thread. In yet another embodiment of the algorithm, there may be a plurality of update threads which may allow for multiple updates simultaneously.

The manager thread may perform a number of tasks including, but not limited to, launching further threads (e.g., the update thread) and sending a track for update as represented in block 176. Tracks to be updated may be placed in the shared queue as represented in block 180. The update thread as in block 178 may perform a number of tasks including receiving updated data packets (i.e., a message) from the manager thread through the shared queue, updating a data track, and/or sending the updated data to a software communications interface (e.g., an ITUNES COM interface developed by MICROSOFT) for updating the media library database as represented in block 178. Metadata to and from the update thread may be temporarily stored in a buffer thread as represented in block 182. Updated data tracks as in block 190 may be transmitted as represented in block 184 and captured and processed by the update page as represented in block 170.

Figure 8:
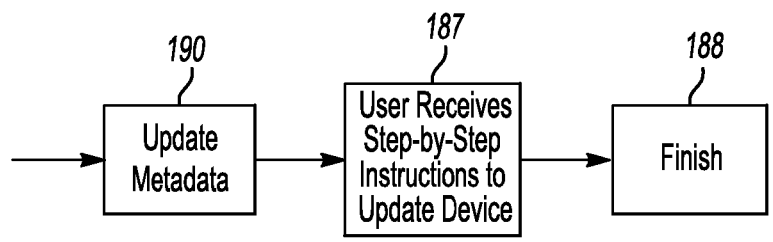
FIG. 8 shows another example of the operation of the normalization of media items playable from a vehicle according to another one of the various embodiments.

A logfile including a confirmation of changes may be generated detailing the changes made to the media library and the media items as represented in block 186. The logfile may be an ASCII text file (or other file format) and may be stored in memory. When the search process has been completed, the wizard may move to a finish page as represented in block 188. In one embodiment, as shown in FIG. 8, instructions may additionally or alternatively be provided for updating a media device with updated media items as in block 187 prior to presentation of the finish page as in block 188 of FIG. 7.

In at least one embodiment, the normalization process may work to resolve incompatibility issues associated with playing media items from the vehicle, including but not limited to: (1) long indexing times, (2) indexing errors whenever metadata is incomplete, and (3) indexing errors whenever metadata exceeds certain limits. The wizard may begin the normalization process by searching the media items stored in terminal 82 (or alternatively CPU 3) to find incompatible media items (i.e., "metadata"). The search of metadata may be controlled based on one or more rules/guidelines and exceptions to these rules programmed to, for example, tool 88. Various embodiments of these rules will now be described. For example, the wizard may include rules to search for particular types of media files. Non-limiting examples include Advanced Audio Encoding (AAC), Waveform Audio Format (WAV), MPEG3 (MP3), Windows Media Audio (WMA), and MPEG4 (MP4). Additionally, or alternatively, the wizard may include rules to search metadata based on one or more characteristics (e.g., genre, artist, album, and track or name).

The search for incorrect metadata conducted by the wizard may be further guided by one or more rules regarding metadata containing whitespaces or null characters (i.e., a null byte). Table 1 provides some non-limiting examples of such rules:

TABLE 1

| Rule | How is it fixed (if violated)? |
| --- | --- |
| Contains 1 or more non-whitespace characters (i.e., Must not be blank, or contain only whitespace) | Use a default string (e.g. "Unknown") |

TABLE 1-continued

| Rule | How is it fixed (if violated)? |
|---|---|
| Contains no whitespace character other than spaces (i.e., no tabs or new lines) | Space characters are used instead |
| Begins and ends with non-whitespace characters | Deletes beginning or ending whitespace |
| All whitespace characters are surrounded by non-whitespace characters | All multi-space fields are truncated to a single space |
| Genre must be in title case | Converted to title case |
| Non-genre meta-data fields longer than 3 characters, cannot be upper case | Converted to title case |

The search for incorrect metadata conducted by the wizard may be further guided by one or more rules regarding the instances of unique media items that may be associated with an identifying characteristic. This rule may ensure that the fields in the media library are different but retain a similarity for media play. For example, a rule may require that only 2000 unique albums be categorized under an artist's name. If a user has more than 4000 albums listed under "The Rolling Stones" (i.e., the rule is violated twice), the wizard will alter the listing as:

The Rolling Stones
The Rolling Stones1
The Rolling Stones2

Table 2 provides some non-limiting examples of such rules:

TABLE 2

| Property | How is it fixed (if violated)? |
|---|---|
| Can have no more than 2000 unique genres | Unrecoverable Error |
| Can have no more than 5000 unique artists within a genre | A new genre is added with an incrementing numeric suffix (e.g., Rock, Rock 1) |
| Can have no more than 2000 unique albums within an artist | A new artist is added with an incrementing numeric suffix (e.g., Eric Clapton, Eric Clapton 1) |
| Can have no more than 2000 tracks within an album | A new album is added with an incrementing numeric suffix (e.g., Album, Album 1) |
| Combinations of genre/artist/album/track do not have to be unique, and do not affect the constraints | |

In one illustrative embodiment, there may be exceptions to the rules which take precedence over the general rules exemplified above in Table 1. Each meta data field may have its own list of exceptions. Accordingly, any data item meeting the exception will not be considered a violation (despite violating the general rules). For example, where a genre for a media item is left blank, the media item may be changed to "unknown genre" rather than "unknown" as exemplified in Table 1.

The normalization process may also include rules for updating the media items in the media library once the invalid metadata has been searched and found. In some instances, a track file may be checked to ensure that it is available for write access. If not, the media item may not be updated (i.e., it is an unrecoverable error). Updates may only be made to erroneous metadata (e.g., metadata that is incompatible with playability from a vehicle). Non-limiting examples may include: (1) any tab, new line, or multiple consecutive space characters may be replaced and updated with a single space character, (2) any meta data field containing more than 3 consecutive capital letters may be normalized to title case, and (3) genres containing different capitalizations (e.g., RoCK or "rock") may be replaced/updated with title case spellings (e.g., "Rock"). Other updating rules may include (1) replacing blank fields (e.g., using Composer and Album Artist metadata as replacements for blank meta data in the Artist field), and (2) using UNICODE encoding for updates.

The wizard may also contain rules for the graphical user interface (GUI). There may be one or more rules pertaining to the operation of the wizard. For example there may be rules relating to (1) the wizard interface (e.g., it may be comprised of screens including introduction, search, update, and conclusion), (2) page presentation, (3) content of the wizard (e.g., an instructions or help option on each page), and/or (4) when the user may quit the wizard (e.g., at anytime or after a search is made). In one embodiment, if the user cancels or quits while updating is in process, the user may receive a prompt asking if the user would like to keep their changes. If not, then any changes may be undone.

There may be further non-limiting rules and features of the wizard. For example, the wizard may maintain a text log of updates and therefore present the user with the changes and the number of changes made to the user's media library. As previously mentioned, the changes may be presented to the user prior to permanently making the changes. For example, the user may be shown the original incorrect metadata (i.e., the file names) compared to the updated version.

The user may be able to expand and collapse all metadata changes (e.g., if there are numerous changes unable to all fit in one screen). Furthermore, the user may be presented with an ongoing progress of the update along with an estimated time to completion. During the search, the wizard may include a search pause/resume button. When the search is complete, there may be an indicator stating that the search is complete (e.g., the pause/resume indicator may change to a "Search Complete" indicator). During the update, the wizard may include an update pause/resume button. When the update is complete, there may be an indicator stating that the update is complete (e.g., the pause/resume indicator may change to an "Update Complete" indicator). In one embodiment, a user may not be able to go to the update screen until the search for incorrect metadata is complete or go to the final screen until the update has completed.

The final wizard page may include a "finish" button. In one embodiment, if there are no errors in the media items, the wizard may skip the update screen and confirm that no errors were found. All changes made to the media library may be stored in a database 86 or in memory (not shown).

In one embodiment, upon completion of the search and updates, the user may connect his or her media device to the user terminal 82 or system 1 (if not already connected) to update the changes to the media device. The user may be presented with instructions on updating the media device (e.g., PMP 65). Accordingly, upon making the updates, the user may receive an error free user experience from their media device. For example, the user may play his or her PMP 65 and receive an error free user experience.

While the best mode for carrying out the invention has been described in detail, those familiar with the art to which this invention relates will recognize various alternative designs and embodiments for practicing the invention as defined by the following claims.

What is claimed:

1. A computer implemented system for monitoring in a vehicle the hands-free accessibility of a plurality of media items from a media item repository for play at the vehicle, the computer implemented system comprising:
   a memory;
   a processor; and
   an audio output controlled by the processor, wherein the processor is configured to:
   receive a first plurality of predetermined rules relating to voice-activated access of one or more media items playable at a vehicle entertainment computing system, wherein requests for access to the one or more media items are received by a voice-recognition engine;
   detect violations of one or more of the first plurality of predetermined rules in relation to the accessibility of the one or more media items based on metadata associated with the one or more media items;
   if one or more violations are detected, output a prompt at the vehicle entertainment computing system regarding the presence of one or more violations in relation to the accessibility of the one or more media items;
   retrieve one or more requested media items based on a voice-activated request for the one or more media items;
   output the one or more requested media items through the audio output; and
   receive a link connecting a media item repository to the processor, wherein the connecting link facilitates the transmission of a plurality of media items between the media item repository and the processor.

2. The computer implemented system of claim 1 wherein the prompt further includes instructions for addressing the one or more violations.

3. The computer implemented system of claim 1 wherein the one or more media items are associated with one or more identifying characteristics and wherein the processor is further configured to access the one or more media items by receiving a spoken request for the one or more media items using the one or more identifying characteristics.

4. The computer implemented system of claim 3 wherein the one or more identifying characteristics includes at least one of a genre, album, artist, or song.

5. The computer implemented system of claim 1 further comprising:
   a media item incompatibility resolution system configured to resolve the one or more violations of the first plurality of predetermined rules by:
   receiving a second plurality of predetermined rules relating to formatting the one or more media items violating the first plurality of predetermined rules in order to enable voice-activated access of the one or more violating media items;
   addressing the one or more violations of the first plurality of predetermined rules by reformatting the one or more violating media items based on the second plurality of predetermined rules to enable voice-activated access of the one or more reformatted media items at the processor; and
   outputting the one or more reformatted media items to the media incompatibility resolution system.

6. The computer implemented system of claim 4 wherein the one or more media items are associated with one or more identifying characteristics, the one or more identifying characteristics having a maximum number of media item associations, wherein addressing the one or more violations further includes incrementing the identifying characteristic upon reaching the maximum number.

7. The computer implemented system of claim 1 wherein the processor is further configured to receive access to all media items not violating the first plurality of predetermined rules and, upon receiving access, play at least one of the plurality of non-violative media items at the processor.

8. The computer implemented system of claim 1 wherein the first plurality of predetermined rules relate to the format of the media items.

9. The computer implemented system of claim 1 wherein the first plurality of predetermined rules relate to the content of the media items.

10. The computer implemented system of claim 1 wherein the prompt is outputted in a spoken language.

11. A computer implemented method for monitoring in a vehicle the hands-free accessibility of a plurality of media items from a media item repository for play at the vehicle, the computer implemented method comprising:
    receiving a first plurality of predetermined rules relating to voice-activated access of one or more media items playable at a vehicle entertainment computing system, wherein requests for access to the one or more media items are received by a voice-recognition engine;
    detecting violations of one or more of the first plurality of predetermined rules in relation to the accessibility of the one or more media items based on metadata associated with the one or more media items;
    if one or more violations are detected, outputting a prompt at the vehicle entertainment computing system regarding the presence of one or more violations in relation to the accessibility of the one or more media items;
    retrieving one or more requested media items based on a voice-activated request for the one or more media items;
    playing the one or more requested media items through an audio output;
    receiving a connection between a media item repository and the vehicle entertainment computing system; and
    facilitating the transmission of a plurality of media items between the media item repository and the vehicle entertainment computing system.

12. The computer implemented method of claim 11 wherein the one or more media items are associated with one or more identifying characteristics and wherein the computer implemented method further comprises accessing the one or more media items by receiving a spoken request for the one or more media items using the one or more identifying characteristics.

13. The computer implemented method of claim 12 wherein the one or more identifying characteristics includes at least one of a genre, album, artist, or song.

14. The computer implemented method of claim 11 further comprising:
    resolving the one or more violations of the first plurality of predetermined rules by:
    receiving a second plurality of predetermined rules relating to formatting the one or more media items violating the first plurality of predetermined rules in order to enable voice-activated access of the of the one or more violating media items;
    addressing the one or more violations of the first plurality of predetermined rules by reformatting the one or more violating media items based on the second plurality of predetermined rules to enable voice-activated access of the one or more reformatted media items at the vehicle entertainment computing device; and outputting the one or more reformatted media items to a media incompatibility resolution system.

15. The computer implemented method of claim 14 wherein the one or more media items are associated with one or more identifying characteristics, the one or more identifying characteristics having a maximum number of media item associations, wherein the addressing step further includes incrementing the identifying characteristic upon reaching the maximum number.

16. The computer implemented method of claim 11 further comprising receiving access to all media items not violating the first plurality of predetermined rules and, upon receiving access, playing at least one of the plurality of non-violative media items.

17. The computer implemented method of claim 11 wherein the prompt further includes instructions for addressing the one or more violations.

18. A computer implemented system for formatting a plurality of media items for accessibility at a vehicle entertainment computing system from a media item repository, the computer implemented system comprising:
   a memory;
   a processor; and
   an audio output controlled by the processor, wherein the processor is configured to:
   resolve one or more violations of a first plurality of predetermined rules with respect to accessing media items at a vehicle entertainment computing system, wherein the first plurality of predetermined rules are stored in a vehicle entertainment computing system, by:
   receive a second plurality of predetermined rules relating to formatting the one or more media items violating the first plurality of predetermined rules;
   based on the second plurality of predetermined rules, searching a plurality of media items stored in a media item repository for the one or more violating media items requiring formatting;
   address the one or more violations of the first plurality of predetermined rules by reformatting the one or more violating media items based on the second plurality of predetermined rules to enable voice-activated access of the one or more reformatted media items;
   output the one or more reformatted media items to the media incompatibility resolution system.

* * * * *